United States Patent
Granig

(10) Patent No.: US 9,780,690 B2
(45) Date of Patent: Oct. 3, 2017

(54) RESONANT DECOUPLED AUXILIARY SUPPLY FOR A SWITCHED-MODE POWER SUPPLY CONTROLLER

(71) Applicant: Infineon Technologies Austria AG, Villach (AT)

(72) Inventor: Wolfgang Granig, Seeboden (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/009,000

(22) Filed: Jan. 28, 2016

(65) Prior Publication Data
US 2017/0222573 A1 Aug. 3, 2017

(51) Int. Cl.
*H02M 7/217* (2006.01)

(52) U.S. Cl.
CPC ................... *H02M 7/217* (2013.01)

(58) Field of Classification Search
CPC ........ H02M 1/14; H02M 1/32; H02M 1/4266; H02M 3/325; H02M 3/3155; H02M 3/33507; H02M 2007/4815; H02M 2001/123
USPC ............ 363/21.01, 21.02, 21.03, 39, 40, 55, 363/56.01, 131
See application file for complete search history.

(56) References Cited

U.S. PATENT DOCUMENTS

| | | |
|---|---|---|
| 5,673,185 A | 9/1997 | Albach et al. |
| 2006/0262577 A1 | 11/2006 | Schenk |
| 2007/0064451 A1 | 3/2007 | Stanley |
| 2008/0089100 A1* | 4/2008 | Park ................... H02M 3/33523 363/21.01 |
| 2008/0130324 A1* | 6/2008 | Choi ................. H02M 3/33507 363/21.03 |
| 2011/0187335 A1* | 8/2011 | Grakist ................... H02M 1/32 323/271 |
| 2014/0062544 A1 | 3/2014 | Weis et al. |
| 2014/0062585 A1 | 3/2014 | Weis |

(Continued)

FOREIGN PATENT DOCUMENTS

| DE | 19513065 A1 | 10/1996 |
|---|---|---|
| DE | 102006041545 A1 | 4/2007 |

(Continued)

OTHER PUBLICATIONS

Herfurth, Michael et al., "Auxiliary Supply for a Switched-Mode Power Supply Controller Using Bang-Bang Regulation", U.S. Appl. No. 14/974,668, filed Dec. 18, 2015.

(Continued)

*Primary Examiner* — Adolf Berhane
(74) *Attorney, Agent, or Firm* — Murphy, Bilak & Homiller, PLLC

(57) ABSTRACT

Switched-mode power supply (SMPS) circuits and a method implemented within an SMPS are provided. The circuits and method use resonant energy capturing and filtering circuitry to provide an auxiliary power supply that may be used to power a controller of an SMPS. This circuitry includes a resonant circuit that recirculates and extracts energy at switch transitions of the SMPS. The circuitry required to implement the circuits and method is minimal, and provides advantages over techniques that require an additional power supply or that require an auxiliary winding in a transformer.

20 Claims, 15 Drawing Sheets

(56) References Cited

U.S. PATENT DOCUMENTS

| | | | |
|---|---|---|---|
| 2014/0112028 A1* | 4/2014 | Fahlenkamp | G01R 22/06 363/21.12 |
| 2014/0112030 A1* | 4/2014 | Fahlenkamp | H02M 3/33507 363/21.14 |
| 2014/0160805 A1* | 6/2014 | Oh | H02M 3/33507 363/21.02 |
| 2014/0204622 A1* | 7/2014 | Telefus | H02M 3/33576 363/21.02 |
| 2014/0368742 A1* | 12/2014 | Joo | H02M 1/4208 348/730 |
| 2015/0062544 A1 | 3/2015 | Ershov | |
| 2015/0263646 A1* | 9/2015 | Hara | B60L 11/1833 363/17 |
| 2015/0280576 A1* | 10/2015 | Hinz | H02M 3/33507 363/21.15 |
| 2015/0349652 A1* | 12/2015 | Lefedjiev | H02M 3/33523 363/21.14 |
| 2016/0099649 A1* | 4/2016 | Hara | H02M 3/3353 363/17 |

FOREIGN PATENT DOCUMENTS

| | | |
|---|---|---|
| EP | 1499005 A1 | 1/2005 |
| ES | 2178583 A1 | 12/2002 |
| WO | 9857417 A1 | 12/1998 |
| WO | 2014067915 A2 | 5/2014 |

OTHER PUBLICATIONS

"Cascode Structure Single Stage Floating Buck Topology", LED Driver IC, ICL8201, Target Data Sheet, Version 1.0, Aug. 25, 2014, Power Management & Multimarket, Infineon Technologies AG, pp. 1-39.

\* cited by examiner

RESONANT DECOUPLED AUXILIARY SUPPLY FOR A SWITCHED-MODE POWER SUPPLY CONTROLLER

TECHNICAL FIELD

The present application relates to circuits and a method for providing an auxiliary power supply as may be used to supply power to a controller of a switched-mode power supply (SMPS). The techniques disclosed provide power to the SMPS controller using minimal additional circuitry within or external to the SMPS.

BACKGROUND

Switched-mode power supplies (SMPS) are widely used for supplying power to electronic devices (loads) such as computers, television sets, lighting systems and other electronic appliances. As with other types of power supplies, an SMPS converts power from a power source into a form more appropriate for a load. In typical applications, the source power is obtained from an alternating current (AC) mains voltage with a frequency of 50 Hz to 60 Hz and root mean square (RMS) voltage levels of 90V to 240V. The SMPS converts this source power into a lower-voltage direct current (DC) power supplied to the load.

SMPS have several advantages over other power supply types. SMPS are often significantly more efficient than other power supply types as they waste less energy in ohmic losses, e.g., as done by power supplies relying on linear regulation. Because wasted energy must typically be dissipated as heat, SMPS have reduced heat dissipation requirements meaning fewer and/or smaller heat sinks are required. Furthermore, some SMPS configurations require no or a smaller transformer than other power supply types. For these reasons, SMPS are often smaller and less expensive than other power supply types.

While there are many configurations for SMPS, all of them switch (enable and disable), at some level, power that is supplied to an output load. An SMPS controller governs this switching by varying parameters such as the frequency and/or duty cycle of a pulse-width-modulated (PWM) signal that is used to drive one or more switch devices, e.g., transistors, such that the output power supplied to a load meets the load's power requirements in terms of voltage and current.

The SMPS controller is, itself, an electronic device that must be powered. Power must be supplied to the SMPS controller during the start-up of the SMPS and for the continuing (steady-state) operation of the SMPS. Some prior solutions for supplying power to the SMPS controller have relied upon a separate power supply that is external to the SMPS. Other solutions have tapped an auxiliary winding of a transformer within the SMPS to supply power to the SMPS controller. Use of an external power supply has the disadvantage that it requires extra circuitry thereby increasing the size and cost of the SMPS system. Use of the auxiliary winding of a transformer requires that the SMPS include a transformer, which may not be desirable in some SMPS designs, e.g., buck converters without a transformer. Even for SMPS designs that incorporate a transformer, it may be preferred to not require the inclusion of an auxiliary winding (having an associated size and cost) within the transformer.

U.S. patent application Ser. No. 14/974,668 discloses techniques for providing power to an SMPS controller. These techniques use a normally-on switch device that is controlled by a bang-bang controller. While these techniques address many of the issues discussed above, the losses associated with the normally-on device, which is typically connected in series across a high-voltage input power source, lead to inefficiencies that would preferably be avoided. Additionally, the bang-bang controller may require additional circuitry and/or complexity, which would also preferably be avoided or, at least, minimized.

Circuits and methods for supplying power to an SMPS controller are desired. Such circuits and methods should require minimal circuit components beyond what is required for the SMPS, and should be capable of efficiently supplying power to an SMPS controller during start-up and steady-state operation of the SMPS.

SUMMARY

According to an embodiment of a switched-mode power supply (SMPS) circuit, power is supplied to a controller of the SMPS and/or some other auxiliary circuitry using a resonant energy capturing and filtering circuit. The SMPS circuit is connected to an input power source and an output load. The SMPS circuit includes an SMPS controller that is configured to generate an output control signal, and a first switch device that is controlled by the output control signal and that provides output power to the output load. The resonant energy capturing and filtering circuit is connected to an output of the first switch device, and is configured to capture and store energy from the input power source upon transitions of the first switch device between its conducting and non-conducting states. The captured energy is used to supply power to a power supply input of the SMPS controller or some other auxiliary circuit.

According to an embodiment of an SMPS circuit configured in a half-bridge configuration, the SMPS circuit is connected to an input power source and supplies a voltage waveform to an output load. The SMPS includes an SMPS controller, and first and second switch devices. Each of the switch devices has an associated driver circuit as well as a resonant energy capturing and filtering circuit. The SMPS controller generates output control signals that are provided to each of the driver circuits. Each driver circuit, in turn, drives an output control signal to control its respective switch device. Each of the driver circuits is provided power from its associated resonant energy capturing and filtering circuit. Each resonant energy capturing and filtering circuit captures energy from the input power source at transitions of the voltage waveform that is being supplied to an output load. This energy is captured when the voltage supplied to the output load transitions from a low voltage state to a high voltage state, from a high voltage state to a low voltage state, or upon both transitions.

According to an embodiment of a method in an SMPS, power is supplied to a controller of the SMPS. The SMPS includes a first switch device that is configured to provide current to a load of the SMPS. Current is supplied from an input power source of the SMPS to the load of the SMPS by enabling the first switch device such that it is conducting. When the first switch device is enabled, current is supplied, via the first switch device, to a resonant energy capturing and filtering device. The first switch device is disabled such that it is not conducting. With the first switch device disabled, current is supplied to the resonant energy capturing and filtering device but not via the first switch device. Power is supplied to a power supply of the SMPS controller from the resonant energy capturing and filtering device.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the following description.

DETAILED DESCRIPTION

Embodiments described herein provide for supplying power to a controller of a switched-mode power supply (SMPS) or to some other auxiliary circuitry during a startup period of the SMPS as well as during its steady-state operation. This is accomplished without requiring an external power supply. The embodiments make use of circuitry that is configured to capture energy from the input power source during the switching of the power supply, and thereby are able to use resonant decoupled power within the SMPS to supply power to the SMPS controller or some other auxiliary circuitry.

Various embodiments will now be described in the following description and the associated figures. These embodiments provide particular examples for purposes of explanation, and are not meant to limit the invention. Features and aspects from the example embodiments may be combined or re-arranged, except where the context does not allow this. Several embodiments are presented in the form of electrical circuits, including electrical components having specific values. One skilled in the art will recognize that the circuit embodiments may be modified, e.g., by changing component values, to meet the needs of particular applications. For these embodiments, the specific topology of the disclosed circuits and the specific components used therein are not intended to limit the invention.

The invention is directed to embodiments of an SMPS. SMPS are, generally, well-known in the art. In order to avoid obfuscating the unique aspects of the invention, well-known aspects related to the control of the SMPS, e.g., determining the frequency and duty cycle for the switching, are not discussed in detail. This would include the determination of such parameters for both open-loop SMPS as well as closed-loop supplies wherein a voltage output of the SMPS is used to determine and/or adjust such parameters.

SMPS may be implemented using a variety of topologies such as flyback, forward, buck, boost, buck-boost, etc. The techniques described herein apply similarly to several such topologies, and the specific topology is not particularly important. In order to avoid unnecessary complexity, the example embodiments will be described using a limited set of topologies, with the understanding that the invention may be implemented within other SMPS topologies also.

Figure 1:
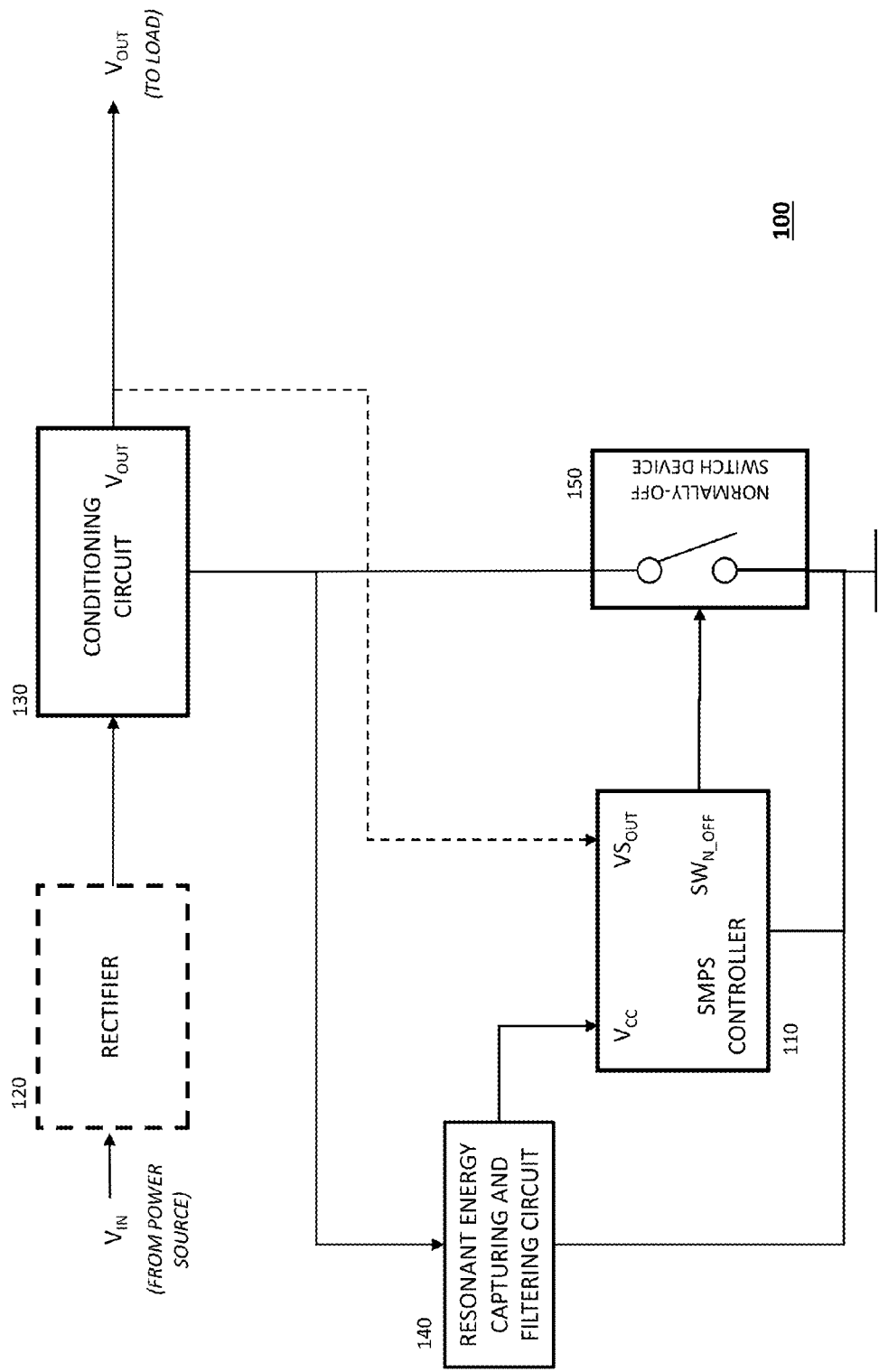
FIG. 1 illustrates a block diagram of a switched-mode power supply (SMPS) that is configured to supply power to a controller of the SMPS.

FIG. 1 illustrates an embodiment of an SMPS 100 that may be used to supply power to a controller 110 of the SMPS. An external power source (not shown) provides power, via input $V_{IN}$, to the SMPS at a rectifier 120 or similar. In typical configurations, the power source may be an alternating current (AC) supply provided by a mains voltage with a frequency of 50 to 60 Hz and a voltage level of 90 to 240 $V_{RMS}$. The rectifier 120 converts the AC voltage into a direct-current (DC) voltage that is supplied to a conditioning circuit 130. In some applications, e.g., battery-powered devices, the power source may supply DC voltage in which case the rectifier may be omitted or replaced with some other circuitry, e.g., a DC transformer or similar.

The conditioning circuit 130 will vary depending upon the topology of the SMPS 100. In an isolated topology, the conditioning circuit 130 may include a flyback transformer wherein current flowing through a primary winding is switched in order to provide a desired output voltage and current at a secondary winding of the transformer. The output voltage $V_{OUT}$ is then provided to some load such as an electronic device (e.g., lighting system, radio, television, appliance). In a non-isolated topology, such as a buck converter, the conditioning circuit 130 typically includes a diode and inductor rather than a flyback transformer. A buck converter is typically smaller and less expensive than an isolated topology based upon a flyback transformer. Henceforth, the SMPS 100 will be described presuming the conditioning circuit 130 includes a flyback transformer, though it should be understood that the SMPS 100 would similarly support other topologies.

Current is switched through the primary winding of a flyback transformer, as included in conditioning circuit 130, using one or more switches such as a switch device 150. The switch device 150 shown in the SMPS 100 is a "normally-off" device, meaning that it does not conduct current unless it is provided with a control signal, e.g., at a control terminal of the switch device, that enables the switch. For example, a positive voltage provided at a control terminal to the normally-off switch device 150 may enable the device such that it conducts current between its input and output terminals. Conversely, a zero voltage provided at this control terminal disables the device 150 such that it conducts no current between its input and output terminal. Should no control signal be provided (as is expected when the SMPS controller is not yet functioning) on the control terminal, e.g., the control terminal is "floating," the switch device 150 defaults to being disabled and conducting no current between its input and output terminals. The normally-off switch device 150 preferably includes an N-channel enhancement-mode metal-oxide semiconductor (MOS) field-effect transistor (FET), though other devices such as junction FETs (JFETs), bipolar junction transistors (BJTs), etc., may be used in some applications.

The SMPS controller 110 controls the switching of current by appropriately controlling switch device 150. The controller 110 typically produces a pulse-width-modulated (PWM) waveform having a frequency and duty cycle configured to produce the required output voltage $V_{OUT}$. In some implementations, the SMPS controller 110 may sense, at an input $VS_{OUT}$, the output voltage $V_{OUT}$ using, e.g., an opto-coupler driven by the output voltage directly, or an auxiliary winding of a flyback transformer within conditioning circuit 130. In such implementations, the PWM waveform may be dynamically adjusted to maintain the required output voltage $V_{OUT}$.

A resonant energy capturing and filtering circuit 140 is configured to provide power to the SMPS controller 110 at its power supply input $V_{CC}$. This circuit 140 captures energy supplied by from the power source $V_{IN}$ via the conditioning circuit 130. Energy is captured by the circuit 140 when the switch device 150 is switched between its conducting and non-conducting states. For steady-state operation of the SMPS 100, this energy capturing is explained in more detail in the circuits and methods described below. Additionally, embodiments described below disclose techniques for supplying power to the SMPS controller 110 during a startup phase occurring before the SMPS 100 reaches its steady-state operation.

While the above description and the SMPS 100 of FIG. 1 describe the resonant energy capturing and filtering circuit 140 as providing power to the SMPS controller 110, the power supply provided by the resonant energy capturing and filtering circuit 140 may similarly provide power to other auxiliary circuitry.

Figure 2:
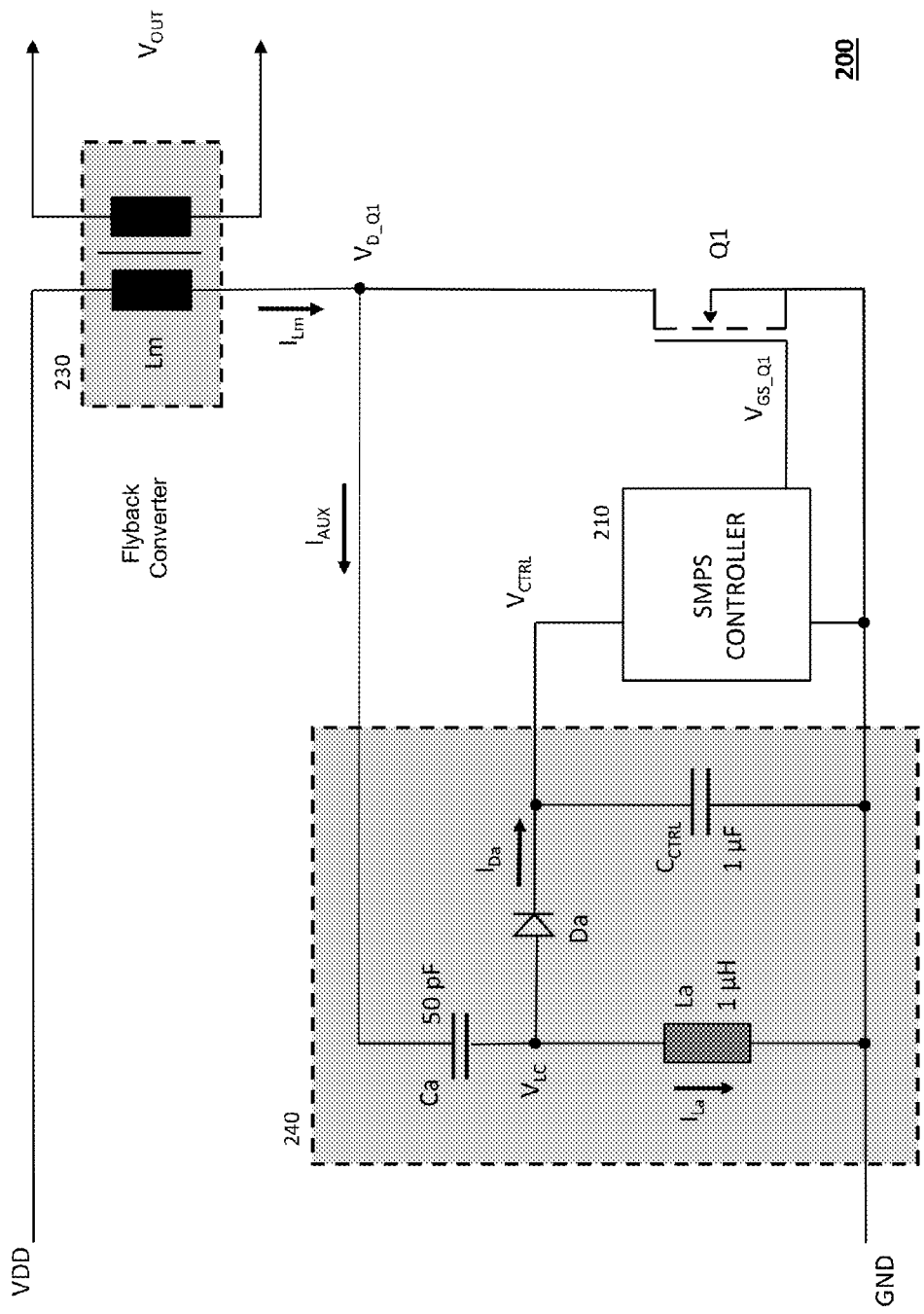
FIG. 2 illustrates an SMPS circuit, including a flyback converter, configured to supply power to a controller of the SMPS.

FIG. 2 illustrates an embodiment of an SMPS circuit 200 that could be used to supply power to a controller 210 of the SMPS. An external source (not shown) provides power at an input $V_{DD}$. This power source may be provided, e.g., by a rectifier connected to an AC mains voltage or by a DC supply. $V_{DD}$ is input to a flyback converter 230 having a primary winding, denoted by Lm, and a secondary winding configured to supply an output voltage $V_{OUT}$ to a load of the SMPS. A current, denoted as $I_{Lm}$, flowing through the primary winding Lm is switched in order to provide an output voltage $V_{OUT}$ and current meeting the requirements of the load. The current $I_{Lm}$ is switched using N-channel enhancement-mode MOSFET Q1, which is controlled using a voltage applied to its gate terminal. When the gate-to-source voltage, denoted $V_{GS\_Q}1$, is above a threshold voltage for MOSFET Q1, MOSFET Q1 is enabled and conducts current. Otherwise, MOSFET Q1 is disabled such that it does not conduct current.

The SMPS controller 210 generates a pulse-width-modulated (PWM) waveform that controls MOSFET Q1 by driving its gate input $V_{GS\_Q}1$. The PWM waveform is generated, using conventional means, with a frequency and duty cycle appropriate to provide the necessary output voltage $V_{OUT}$ and current from the SMPS. The SMPS controller is powered by a power supply input $V_{CTRL}$.

A resonant energy capturing and filtering circuit 240 is configured to provide power to the SMPS controller 210. This circuit 240 includes a capacitor $C_a$, an inductor $L_a$, a diode $D_a$, and a capacitor $C_{CTRL}$. Capacitor $C_a$ and inductor $L_a$ are configured such that they capture energy in conjunction with the switching of MOSFET Q1 from between its conducting and non-conducting states. At these transitions, the voltage potential at the node connecting capacitor $C_a$, and inductor $L_a$, denoted as $V_{LC}$, will oscillate and, at times, rise to relatively high voltages including levels higher than the SMPS power supply input $V_{CTRL}$.

Diode $D_a$ is configured to supply current from the voltage node $V_{LC}$ to the voltage node $V_{CTRL}$ when the potential at node $V_{LC}$ rises to a level high enough to forward bias diode $D_a$. For example, with a nominal SMPS controller input voltage $V_{CTRL}$ of 13.5V and a diode threshold voltage of 0.6V, diode $D_a$ will conduct current when the voltage at $V_{LC}$ is above 14.1V. The current flowing through diode $D_a$, denoted as $I_{Da}$, will supply the SMPS controller 210. Any portion of the current $I_{Da}$ not flowing to the SMPS controller 210 will flow into capacitor $C_{CTRL}$ where energy is stored. When no current is being supplied by diode $D_a$, the SMPS controller 210 is supplied power by drawing current from capacitor $C_{CTRL}$. The diode $D_a$ serves to prevent current from flowing from $V_{CTRL}$ back to $V_{LC}$.

Consider the operation of the resonant energy capturing and filtering circuit 240 in conjunction with the switching of MOSFET Q1 when the SMPS is operating in its steady-state phase. The switching of MOSFET Q1 between its conducting and non-conducting states, and the associated voltage swing at the drain of MOSFET Q1, i.e., $V_{D\_Q}1$, will induce a voltage oscillation at the node between capacitor $C_a$ and inductor $L_a$, i.e., $V_{LC}$. As explained above, whenever the voltage at $V_{LC}$ rises above a threshold, e.g., 14.1V, energy will be transferred from $V_{LC}$ to the SMPS controller power supply node $V_{CTRL}$. This will now be explained in further detail in conjunction with the waveforms of FIG. 3.

Figure 3A:
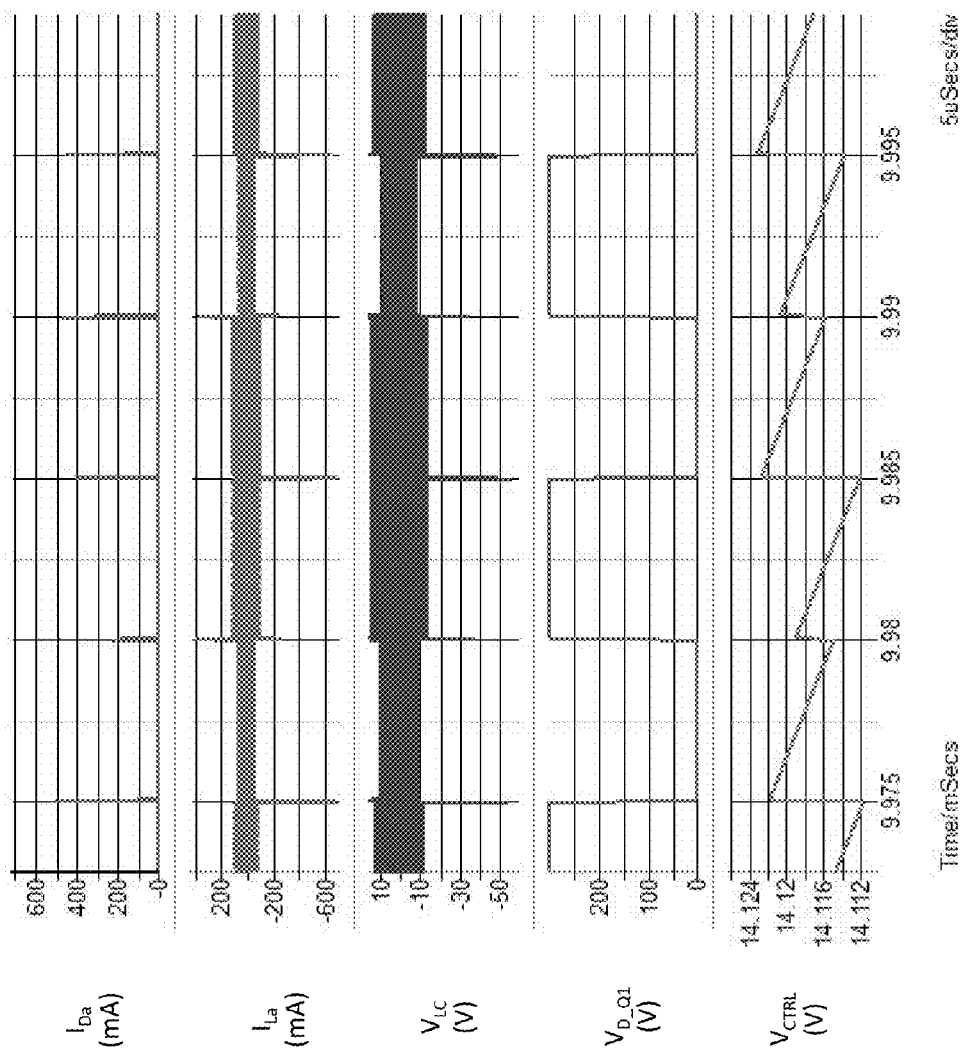
FIGS. 3A, 3B, and 3C illustrate waveforms produced by an SMPS circuit configured to supply power to a controller of the SMPS.

FIG. 3A illustrates waveforms generated by SMPS circuit 200 when it is operating with a switching frequency of 100 KHz. The switching is controlled by SMPS controller 210, which drives the gate voltage of MOSFET Q1. When MOSFET Q1 is disabled, the voltage at the drain of MOSFET Q1, $V_{D\_Q}1$, floats to the external voltage source input $V_{DD}$. When the MOSFET Q1 is enabled, the voltage $V_{D\_Q}1$ is driven towards ground. This is shown in the voltage waveform $V_{D\_Q}1$, which alternates between approximately 0 and 300V. At each transition of $V_{D\_Q}1$, the SMPS controller power supply voltage $V_{CTRL}$ increases rapidly as capacitor $C_{CTRL}$ is charged. Between these transitions, the voltage $V_{CTRL}$ slowly decreases as the SMPS controller draws current from $C_{CTRL}$ to power itself.

Note that the transitions in $V_{D\_Q}1$ also lead to oscillations in the current $I_{La}$ and the voltage $V_{LC}$. This, in turn, leads to current flowing through diode $D_a$, as shown in the current waveform for $I_{Da}$. Positive current $I_{Da}$ flowing through diode $D_a$, as occurs in the vicinity of transitions in voltage $V_{D\_Q}1$ charges capacitor $C_{CTRL}$ which leads to the rapid increases in $V_{CTRL}$ shown in FIG. 3A.

Immediately after disabling MOSFET Q1, current $I_{Lm}$ continues flowing through Lm, but is routed to capacitor $C_a$ rather than into MOSFET Q1. This current, denoted as $I_{AUX}$ in FIG. 2, charges capacitor $C_a$ until it reaches the voltage $V_{DD}$. Once this equilibrium is reached, there is no substantial current $I_{Lm}$ or $I_{AUX}$ while MOSFET Q1 remains disabled.

Figures 3B, 3C:
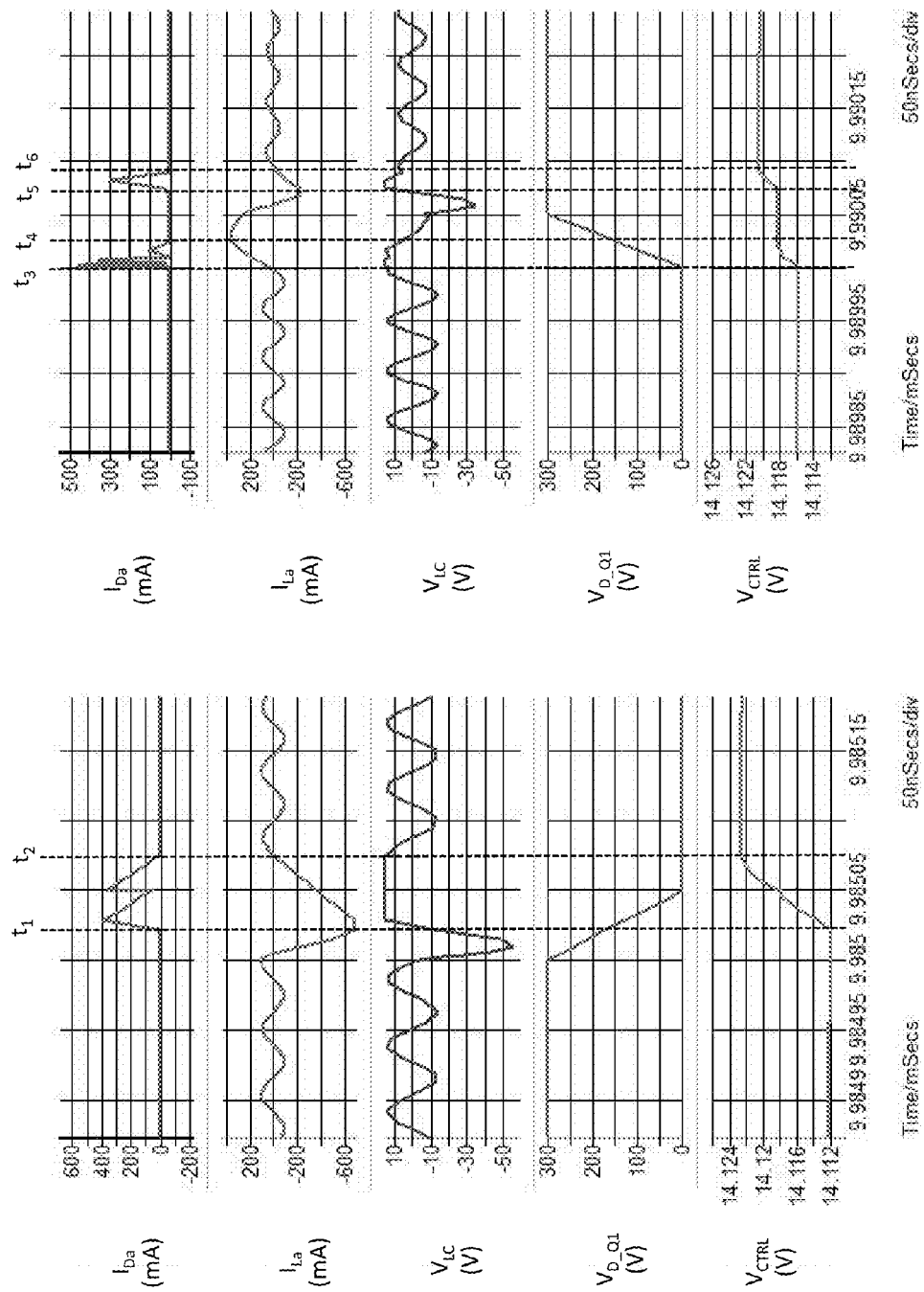

FIG. 3B illustrates an expanded view of the waveforms when the MOSFET Q1 is enabled at time 9.985 mSecs. At this transition, the charge stored on capacitor $C_a$ will induce a current (negative $I_{AUX}$) that flows through MOSFET Q1 and inductor $L_a$ (from its ground side). As shown in the waveform for $I_{La}$, this current increases in magnitude between time 9.985 mSecs and time $t_1$. The voltage $V_{LC}$ is based upon the rate of change of the current $I_{La}$ across inductor $L_a$. As the current $I_{La}$ becomes increasingly negative after time 9.985 mSecs, the voltage at $V_{LC}$ also becomes negative. At time $t_1$, the magnitude of the current flow stops increasing $$\left(i.e., \frac{dI_{La}}{dt} = 0\right)$$

leading to a zero voltage at $V_{LC}$. Subsequently, the current $I_{La}$ begins increasing (becoming less negative) thereby inducing a positive voltage across $V_{LC}$ starting shortly after time $t_1$. As the voltage at $V_{LC}$ reaches levels high enough to forward bias diode $D_a$, e.g., around 14.1V, current will begin flowing through diode $D_a$. This is shown between times $t_1$ and $t_2$ in the waveform $I_{Da}$. With current flowing across $D_a$ during this period, the capacitor $C_{CTRL}$ is charged and the voltage $V_{CTRL}$ increases as shown.

FIG. 3C illustrates a corresponding expanded view of the waveforms when MOSFET Q1 is disabled at time 9.900 mSecs. Upon disabling MOSFET Q1, current flowing through the primary winding Lm will be directed to capacitor $C_a$. Positive current, $I_{La}$, will be induced (downwards) through inductor $L_a$ leading to a positive voltage at $V_{LC}$. When the rate of change of current $I_{La}$ is sufficiently high, the voltage $V_{LC}$ will reach levels at which diode $D_a$ is forward biased such that current $I_{Da}$ flows through the diode. This occurs between times $t_3$ and $t_4$ and again between times $t_5$ and $t_6$ in FIG. 3C. For each of these time periods, the capacitor $C_{CTRL}$ is charged and the voltage $V_{CTRL}$ increases as shown.

Figure 4:
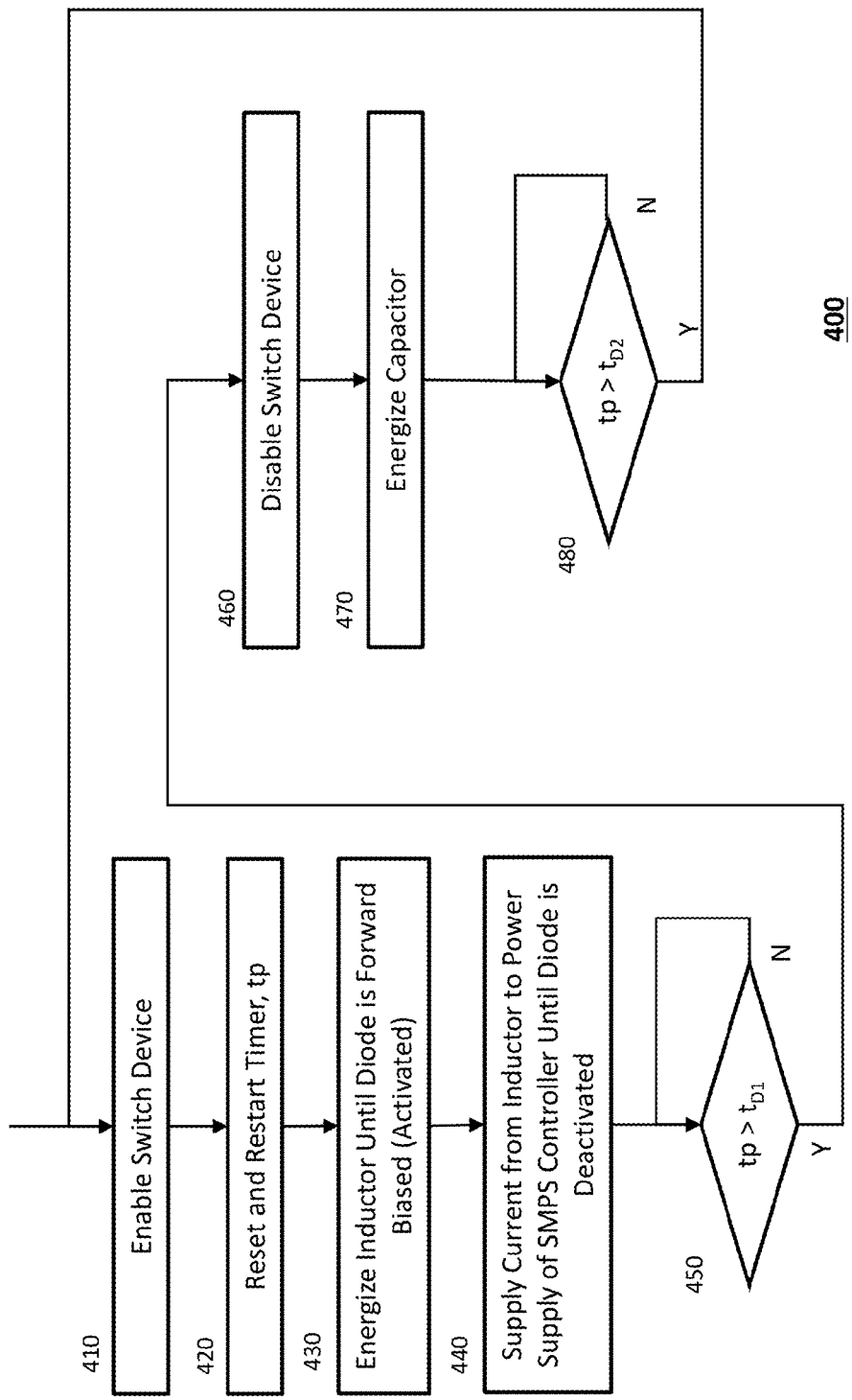
FIG. 4 illustrates a method for supplying power to an SMPS controller.

FIG. 4 illustrates an embodiment of a method that could be used to supply power to an SMPS controller. This method could be implemented in an SMPS circuit such as that illustrated in FIG. 2.

The method 400 begins by enabling a switch device 410, such as the MOSFET Q1 in FIG. 2. A timer $t_p$, as might be included in SMPS controller 210, is reset and started 420. The timer $t_p$ is used to keep the switch device enabled for a time period $t_{D1}$. The time period $t_{D1}$ might be determined by an SMPS controller 210 using conventional techniques. Next, an inductor is energized by allowing current to flow through the switch device and into the inductor. This continues until a diode connected to the inductor is forward biased 430. With the diode forward biased, current is supplied from the inductor to a power supply of an SMPS controller. The supplied current additionally charges an energy storage component, such as capacitor $C_{CTRL}$. This current supply continues until the inductor is sufficiently de-energized such that the diode is deactivated 440. With no current flowing through the diode, the SMPS controller enters a period in which it is powered from the energy storage component, e.g., capacitor $C_{CTRL}$. This period continues until the timer indicates that the time period $t_{D1}$ has expired 450.

Once the time period $t_{D1}$ has expired, the method 400 continues by disabling the switch device 460. Current from an external source is routed to a capacitor, such as capacitor $C_a$ of SMPS circuit 200, in order to energize the capacitor. With the capacitor energized, the timer $t_p$ is again monitored to determine when the time period toe has expired 480. The time period toe might be determined by an SMPS controller 210 using conventional techniques. At the expiration of this time period, the method 400 starts over by enabling the switch device 410.

Figure 5:
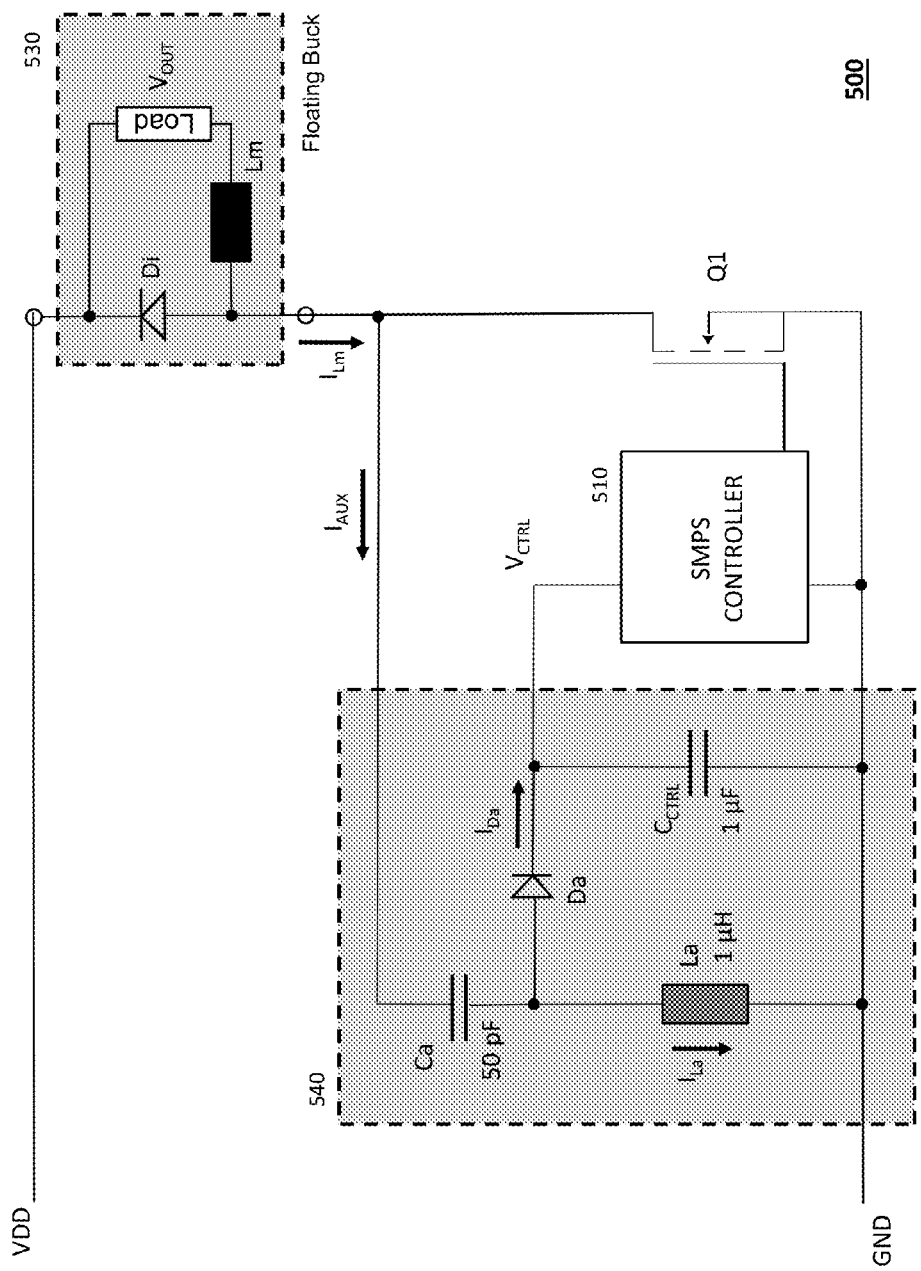
FIG. 5 illustrates a variant of the SMPS circuit of FIG. 2 in which the flyback converter is removed and the SMPS is configured in a floating buck topology.

FIG. 5 illustrates an alternative embodiment of an SMPS circuit 500 that could be used to supply power to a controller 510 of an SMPS. In this embodiment, the flyback converter (transformer) of FIG. 2 has been replaced with circuitry 530 to implement a floating buck converter. A floating buck converter has cost and size advantages over a flyback converter (or most other isolated topologies), as a floating buck converter requires no transformer. The functionality, particularly as it relates to the resonant energy capturing and filtering circuit 540, for this alternative embodiment is largely the same as that of the embodiment illustrated in FIG. 2 and, thus, will not be explained in further detail. Note that topologies other than the flyback converter and floating buck converter, e.g., boost converter, buck-boost converter, forward, half-forward, may also be supported by circuits similar to those of FIGS. 2 and 5.

Figure 6:
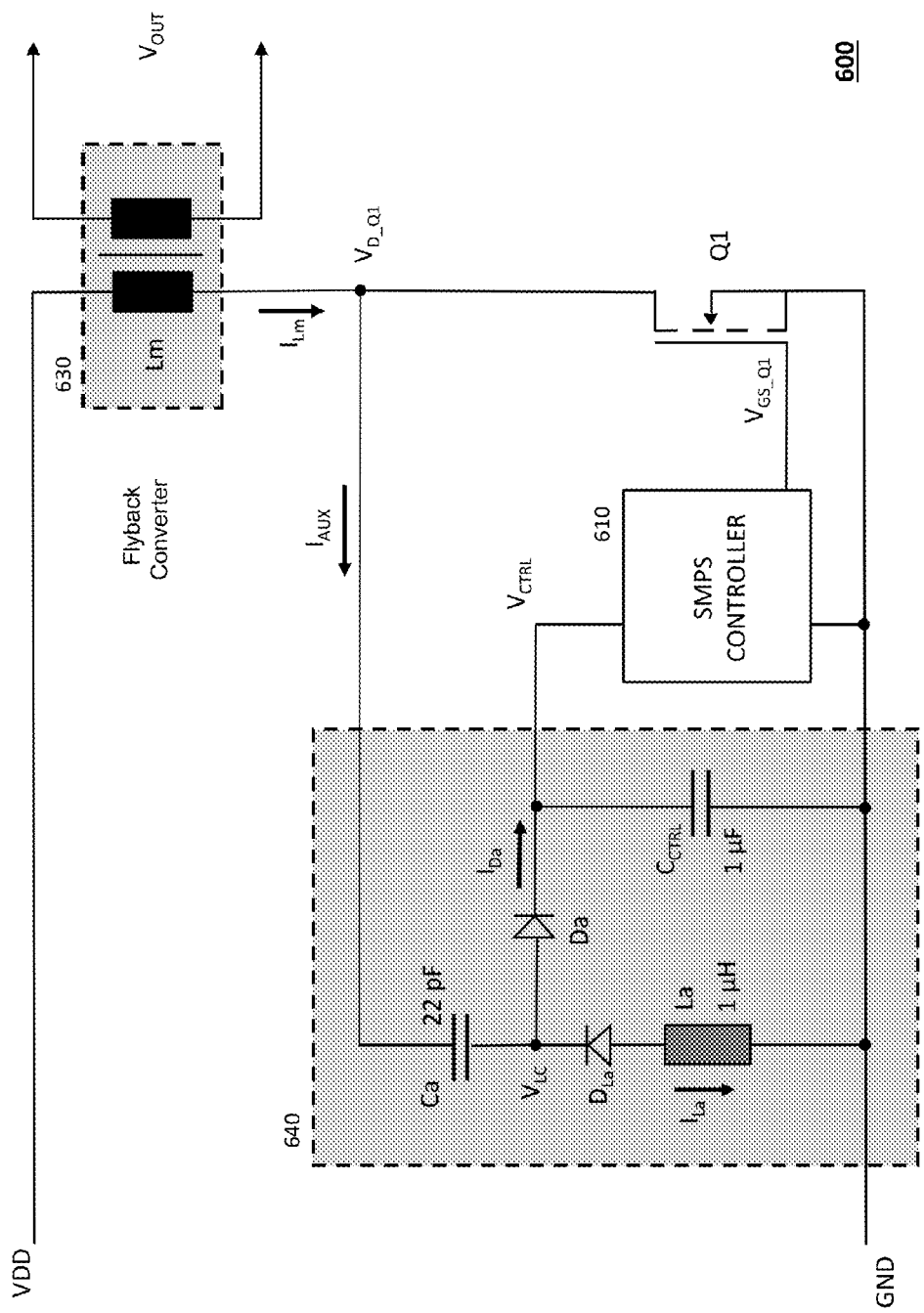
FIG. 6 illustrates another variant of the SMPS circuit of FIG. 2 in which an additional diode is included.

FIG. 6 illustrates yet another embodiment of an SMPS circuit 600 that could be used to supply power to a controller 610 of an SMPS. This embodiment represents a minor variation of the SMPS circuit 200 illustrated in FIG. 2, and only the differences between these circuits are described here. The resonant energy capturing and filtering circuit 640 includes a diode $D_{La}$ that serves to prevent current from flowing down through inductor $L_a$, i.e., from node $V_{LC}$ towards ground. Hence, energy stored at node $V_{LC}$, e.g., on the bottom of capacitor $C_a$, cannot escape back into inductor $L_a$ via a current flow from $V_{LC}$ to ground. While this circuit 640 provides a voltage $V_{CTRL}$ that is similar to that provided by the circuit 240 of FIG. 2, the circuit 640 requires a smaller capacitor $C_a$ and is capable of supplying power to an SMPS controller 610 having a lower power supply impedance (higher load) than that of the SMPS controller 210 illustrated in FIG. 2.

Figures 7A, 7B:
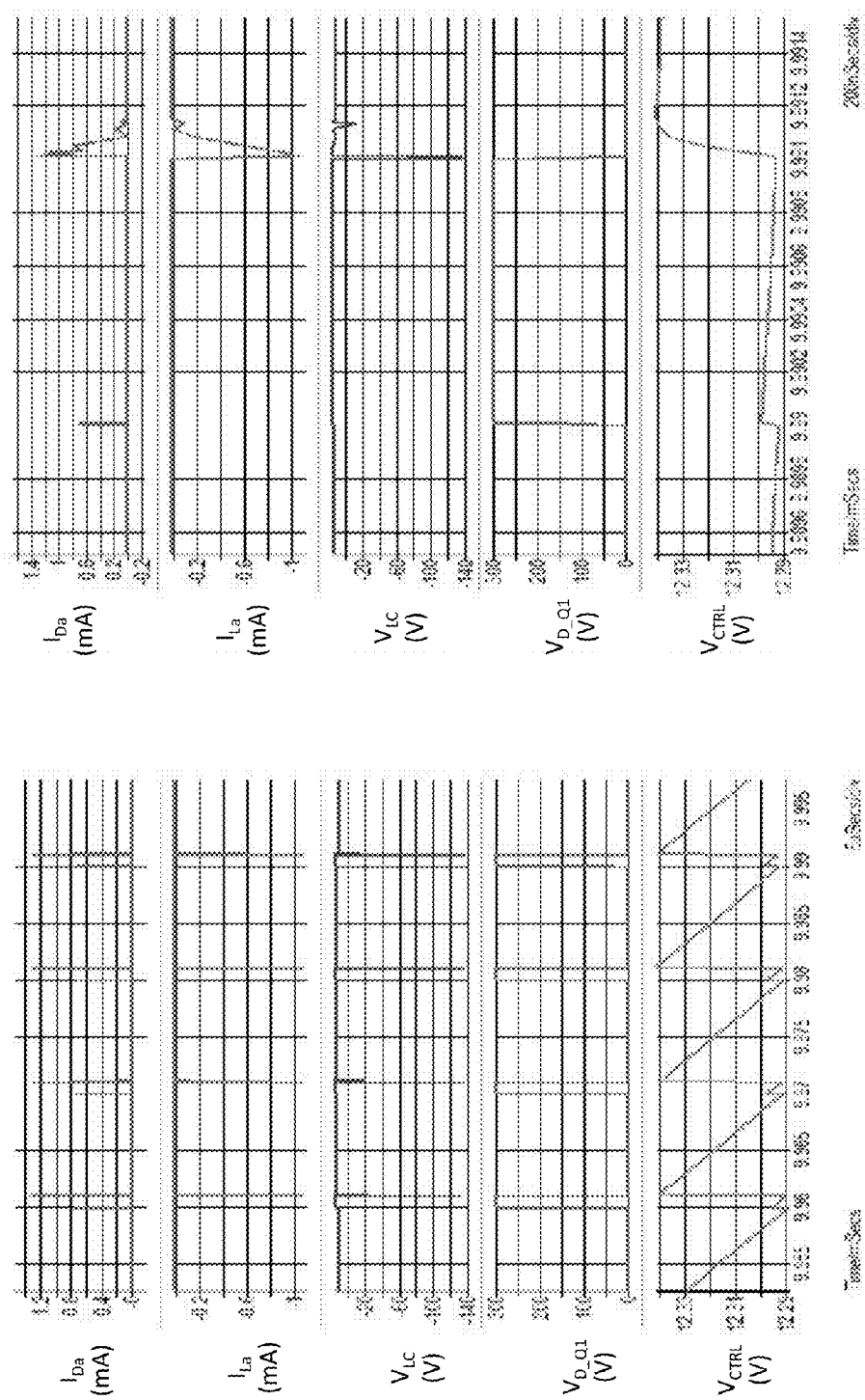
FIGS. 7A and 7B illustrate waveforms produced by an SMPS circuit, such as that illustrated in FIG. 6, that is configured to supply power to a controller of the SMPS.

FIGS. 7A and 7B illustrate waveforms generated by the SMPS circuit 600 of FIG. 6 in much the same way as FIGS. 3A to 3C did for the SMPS circuit 200 of FIG. 200. Note that the duty cycle of the switching in FIG. 7A, as indicated by the waveform $V_{D\_Q}1$ is considerably different from that shown in FIGS. 3A-3C. Also note that capacitor $C_{CTRL}$ is primarily charged when the MOSFET Q1 is enabled (and $V_{D\_Q}1$ is driven low), as indicated by the voltage waveform $V_{D\_Q}1$. While $C_{CTRL}$ is also charged when $V_{D\_Q}1$ floats high (i.e., when MOSFET Q1 is disabled), the magnitude of the charging and the corresponding increase in $V_{CTRL}$ is considerably smaller at this transition. As expected, the current $I_{La}$ through inductor $L_a$ is always negative. (In the context of the SMPS circuit 600, this means current only flows through inductor $L_a$ from ground to the node $V_{LC}$.)

The circuits and method presented thus far only consider the steady-state phase of an SMPS, i.e., the period of time after the SMPS controller is operating a switch device in order to provide output power to some load. The SMPS controller must also be supplied with power during its startup phase before it reaches steady-state operation. Henceforth, several alternative circuits for supplying power to an SMPS controller during its startup phase are described.

Figure 8:
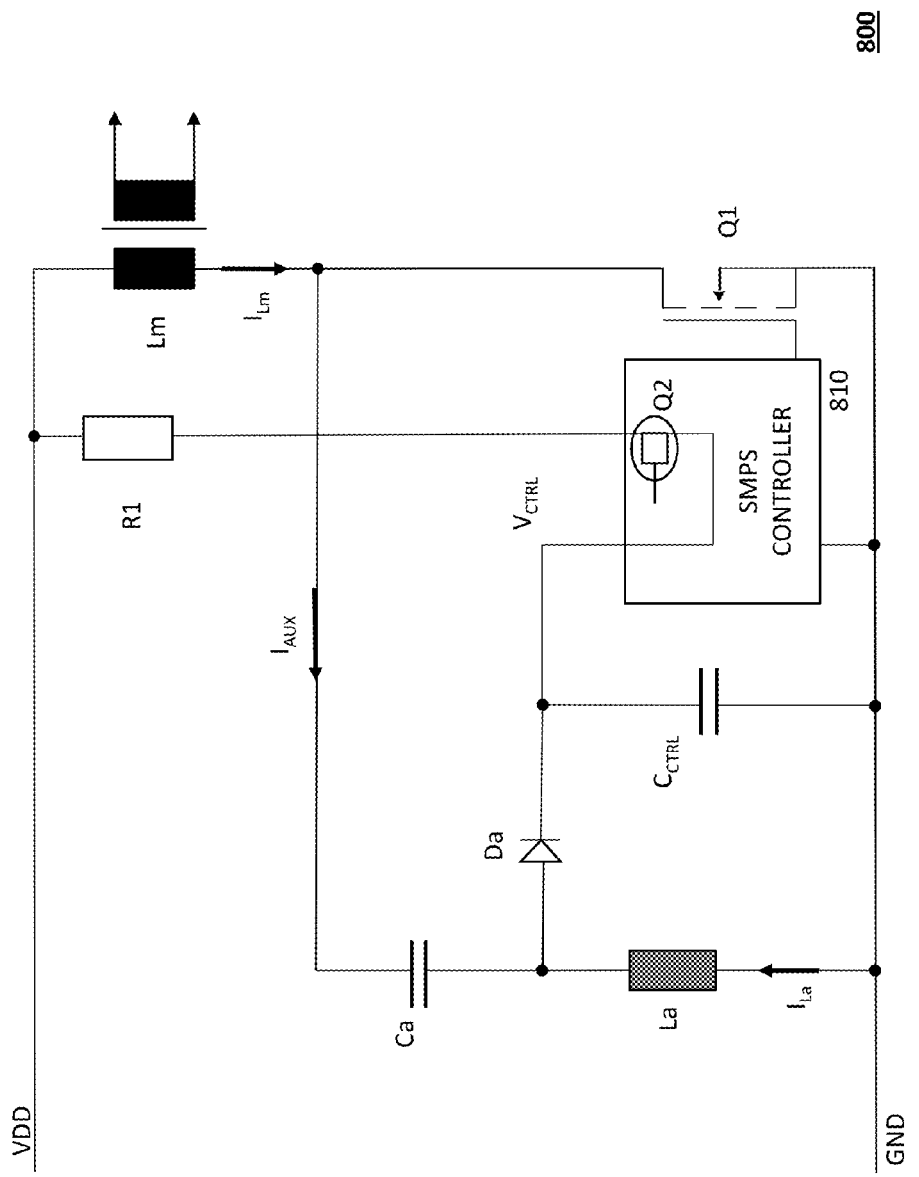
FIG. 8 illustrates an SMPS circuit configured to supply power to a controller of an SMPS, and that includes a depletion-mode metal-oxide semiconductor field-effect transistor (MOSFET) for supplying such power during a startup phase of the SMPS.

FIG. 8 illustrates an embodiment of an SMPS circuit 800 that could be used to supply power to a controller 810 of an SMPS. The SMPS circuit 800 is the same as that illustrated in FIG. 2, except that a depletion-mode MOSFET Q2 and a resistor R1 are included in order to supply power to the SMPS controller 810 during a startup phase. MOSFET Q2 is a "normally-on" switch device, which means that MOSFET Q2 will conduct current unless an appropriate voltage (e.g., −2V) is driven onto its gate (control) terminal. Before the SMPS controller 810 begins switching MOSFET Q1, current flows from an external source $V_{DD}$ through resistor R1 and MOSFET Q2 in order to charge capacitor $C_{CTRL}$ and increase the voltage at node $V_{CTRL}$. Once the voltage $V_{CTRL}$ reaches a level (e.g., 12V) sufficient to supply power to the SMPS controller 810, the SMPS controller 810 will begin operating. Soon after the SMPS controller 810 begins operation, it will disable MOSFET Q2 by driving an appropriate voltage (e.g., −2V) across the gate-to-source terminals of MOSFET Q2. Subsequently, the SMPS controller will not be supplied power by MOSFET Q2. With the steady-state phase commenced, the SMPS controller 810 will begin switching MOSFET Q1, and power is supplied to the SMPS controller 810 in the same manner as described regarding the SMPS circuit 200 of FIG. 2. Note that MOSFET Q2 could also be located external to the SMPS controller 810. Also note that a protection diode (not shown), e.g., a 12V avalanche diode, may be placed between $V_{CTRL}$ and ground in order to prevent $V_{CTRL}$ from reaching an overvoltage situation, particularly in the startup phase of the SMPS circuit 800.

Figure 9:
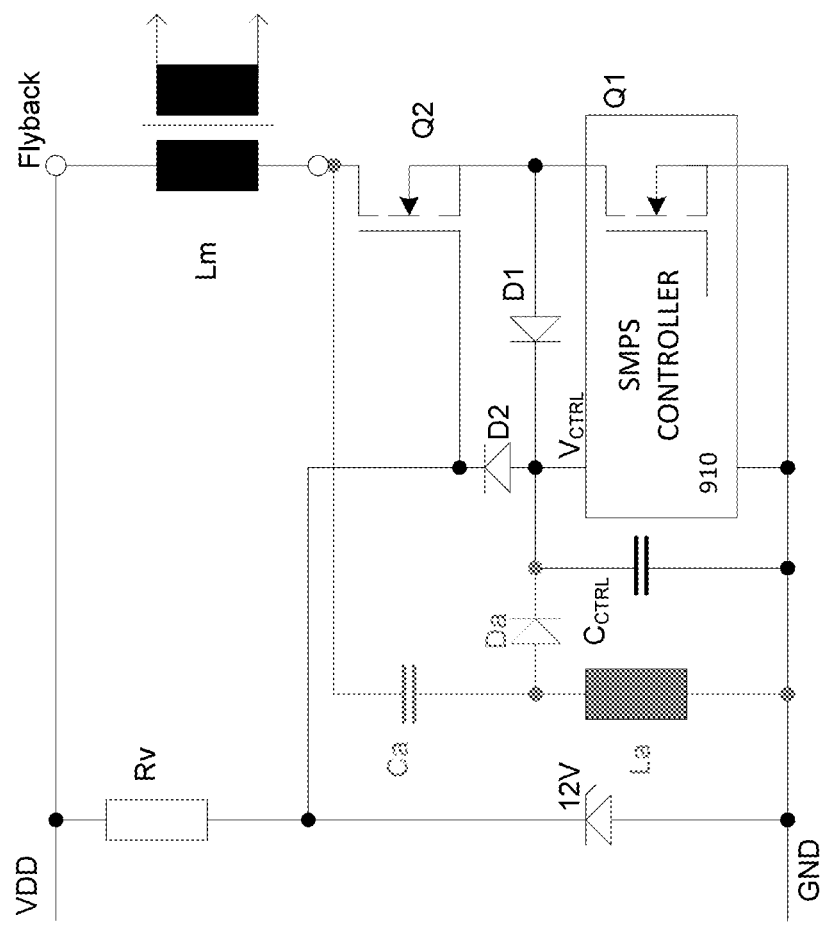
FIG. 9 illustrates an SMPS circuit configured to supply power to a controller of an SMPS, and that includes an enhancement-mode MOSFET for supplying such power during a startup phase of the SMPS.

FIG. 9 illustrates an alternative embodiment of an SMPS circuit 900 that could be used to supply power to a controller 910 of an SMPS, including during a startup phase of the SMPS. This SMPS circuit 900 is similar to that of FIG. 8, but the depletion-mode MOSFET has been replaced with enhancement-mode MOSFET Q2, a pullup resistor Rv, and a 12V Zener diode. During the startup phase of SMPS circuit 900, the SMPS controller 910 does not control (switch) MOSFET Q1. Hence, MOSFET Q1 is in its default state of "off." The external power source $V_{DD}$, via resistor Rv and the 12V Zener diode, pulls the gate of enhancement-mode MOSFET Q2 high (relative to the source terminal of MOSFET Q2) to place MOSFET Q2 in its conducting state, so that current is conducted from $V_{DD}$ via primary winding Lm through MOSFET Q2. With MOSFET Q1 not conducting, this current then flows through diode D1 in order to charge capacitor $C_{CTRL}$ and increase the voltage at node $V_{CTRL}$. Once the voltage $V_{CTRL}$ reaches a level (e.g., 12V) sufficient to supply power to the SMPS controller 910, the SMPS controller 910 will begin operating. With the steady-state phase commenced, the SMPS controller 910 will switch MOSFET Q1, and power is supplied to the SMPS controller 910 in the same manner as described regarding the SMPS circuits of FIG. 2 or 8. While MOSFET Q1 is illustrated as being within the SMPS controller 910, it could also be located external to the SMPS controller 910 as shown in prior circuits.

Figure 10:
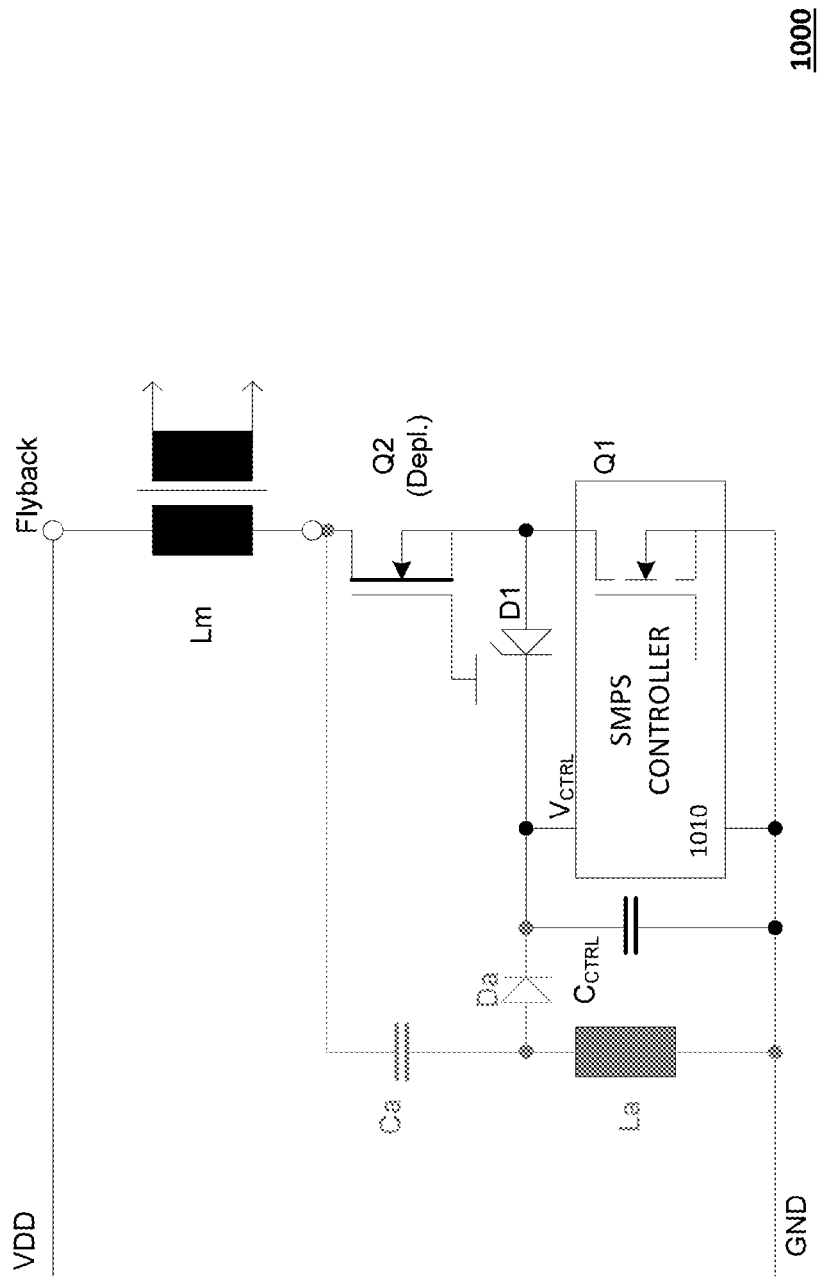
FIG. 10 illustrates another SMPS circuit configured to supply power to a controller of an SMPS, and that includes a depletion-mode MOSFET for supplying such power during a startup phase of the SMPS.

FIG. 10 illustrates yet another alternative embodiment of an SMPS circuit 1000 that could be used to supply power to a controller 1010 of an SMPS, including during a startup phase of the SMPS. The SMPS circuit 1000 includes a depletion-mode MOSFET Q2 and a diode D1. The MOSFET Q2 is a "normally-on" device and, with its gate grounded as shown in FIG. 10, will conduct current during the startup phase. During the startup phase of the SMPS circuit 1000, the SMPS controller 1010 does not control (switch) MOSFET Q1 and, hence, MOSFET Q1 is in its default "off" state. With MOSFET Q1 not conducting, current flows, via winding Lm, from $V_{DD}$ through MOSFET Q2 and diode D1 in order to charge capacitor $C_{CTRL}$ and increase the voltage at node $V_{CTRL}$. Once the voltage $V_{CTRL}$ reaches a level (e.g., 12V) sufficient to supply power to the SMPS controller 1010, the SMPS controller 1010 will begin operating. With the steady-state phase commenced, the SMPS controller 1010 will switch MOSFET Q1, and power is supplied to the SMPS controller 1010 in much the same manner as described regarding the SMPS circuits of FIG. 2 or 9. While MOSFET Q1 is illustrated as being within the SMPS controller 1010, it could also be located external to the SMPS controller 1010 as shown in prior circuits. The diode D1 may be a Zener diode, in which case it provides overvoltage protection for $V_{CTRL}$.

Figure 11:
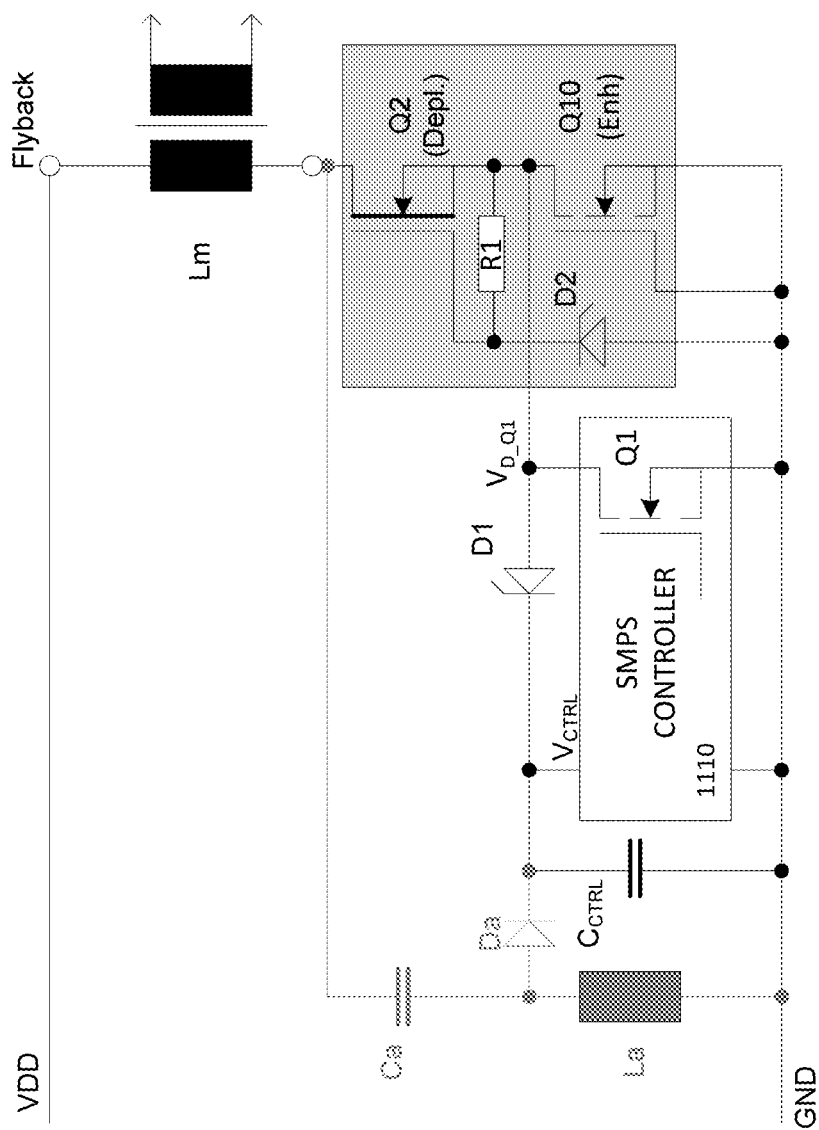
FIG. 11 illustrates yet another SMPS circuit configured to supply power to a controller of an SMPS, and that includes a depletion-mode MOSFET and diodes for supplying such power during a startup phase of the SMPS.

FIG. 11 illustrates another alternative embodiment of an SMPS circuit 1100 that could be used to supply power to a controller 1110 of an SMPS, including during a startup phase of the SMPS. This SMPS circuit 1100 combines elements of the SMPS circuits illustrated in FIGS. 9 and 10. A depletion-mode MOSFET Q2 and a diode D1 are included in order to supply power to the SMPS controller 1110 during a startup phase. MOSFET Q2 is a "normally-on" switch device, which means that MOSFET Q2 will conduct current unless an appropriate voltage (e.g., −2V or less) is driven onto its gate (control) terminal relative to its source terminal. Before the SMPS controller 1110 begins switching enhancement-mode MOSFET Q1, current flows from an external source $V_{DD}$ through MOSFET Q2 and diode D1 in order to charge capacitor $C_{CTRL}$ and increase the voltage at node $V_{CTRL}$. Zener diode D2 determines the voltage level at $V_{CTRL}$ during the startup phase of the SMPS. If the voltage at $V_{D\_Q}1$, which is equivalent to $V_{CTRL}$ plus the threshold voltage of diode D1 when current is flowing through diode D1, reaches a high enough level, MOSFET Q2 is disabled. This level is determined by the threshold voltage of MOSFET Q2 (e.g., a magnitude of 2V) and the reverse breakdown voltage of Zener diode D2 (e.g., 12V). During steady-state operation of the SMPS circuit 1100, Zener diode D1 provides overvoltage protection when MOSFET Q1 is enabled.

In the embodiment shown in FIG. 11, the gate of MOSFET Q10 is shorted to its source, thereby disabling conduction and rendering this MOSFET Q10 redundant. In alternatives to the illustrated SMPS circuit 1100, the SMPS controller 1110 may not include an internal MOSFET Q1. In one such alternative, the SMPS controller 1110 might control an external switch such as MOSFET Q10. In this case (not shown), the gate of MOSFET Q10 would not be shorted and would instead by driven by, e.g., a PWM waveform generated by the SMPS controller 1110.

Figure 12:
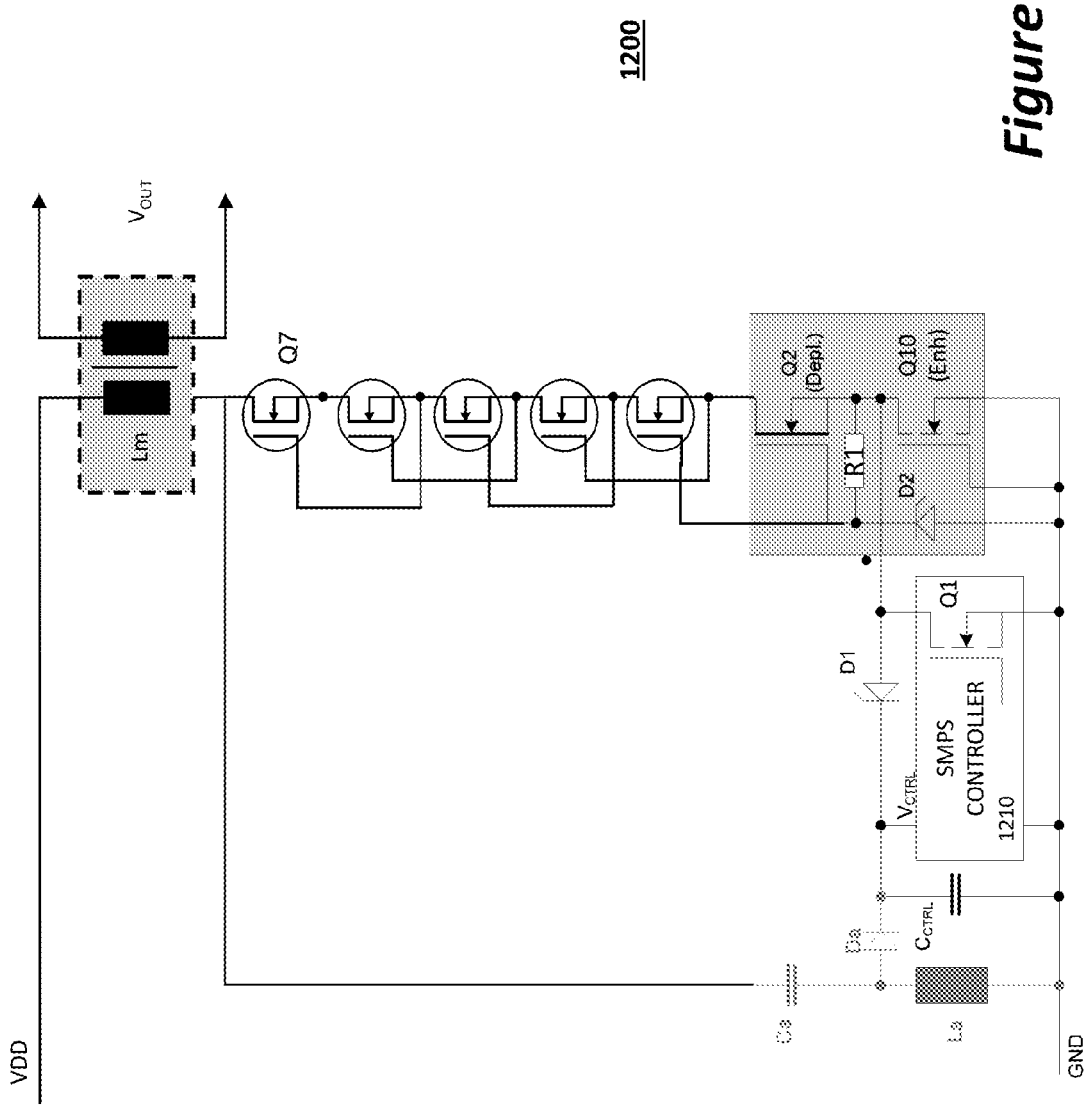
FIG. 12 illustrates a variation on the SMPS circuit of FIG. 11, in which the depletion-mode MOSFET of FIG. 11 is replaced with a plurality of depletion-mode MOSFETs cascaded together.

FIG. 12 illustrates yet another alternative embodiment of an SMPS circuit 1200 that could be used to supply power to a controller 1210 of an SMPS, including during a startup phase of the SMPS. This SMPS circuit 1200 is the same as the SMPS circuit 1100 of FIG. 11, except that the depletion-mode MOSFET Q2 of FIG. 11 is replaced with a plurality of MOSFETs Q2-Q7 that are cascaded together. Otherwise, SMPS circuit 1200 operates much like SMPS circuit 1100, and, hence, will not be described in further detail. Note that the capacitor Ca of SMPS circuit 1200 is shown as being connected to the drain of MOSFET Q7, but, in some applications, it may be preferable to connect it elsewhere in the cascaded MOSFET chain, e.g., to the drain of MOSFET Q2.

Figure 13:
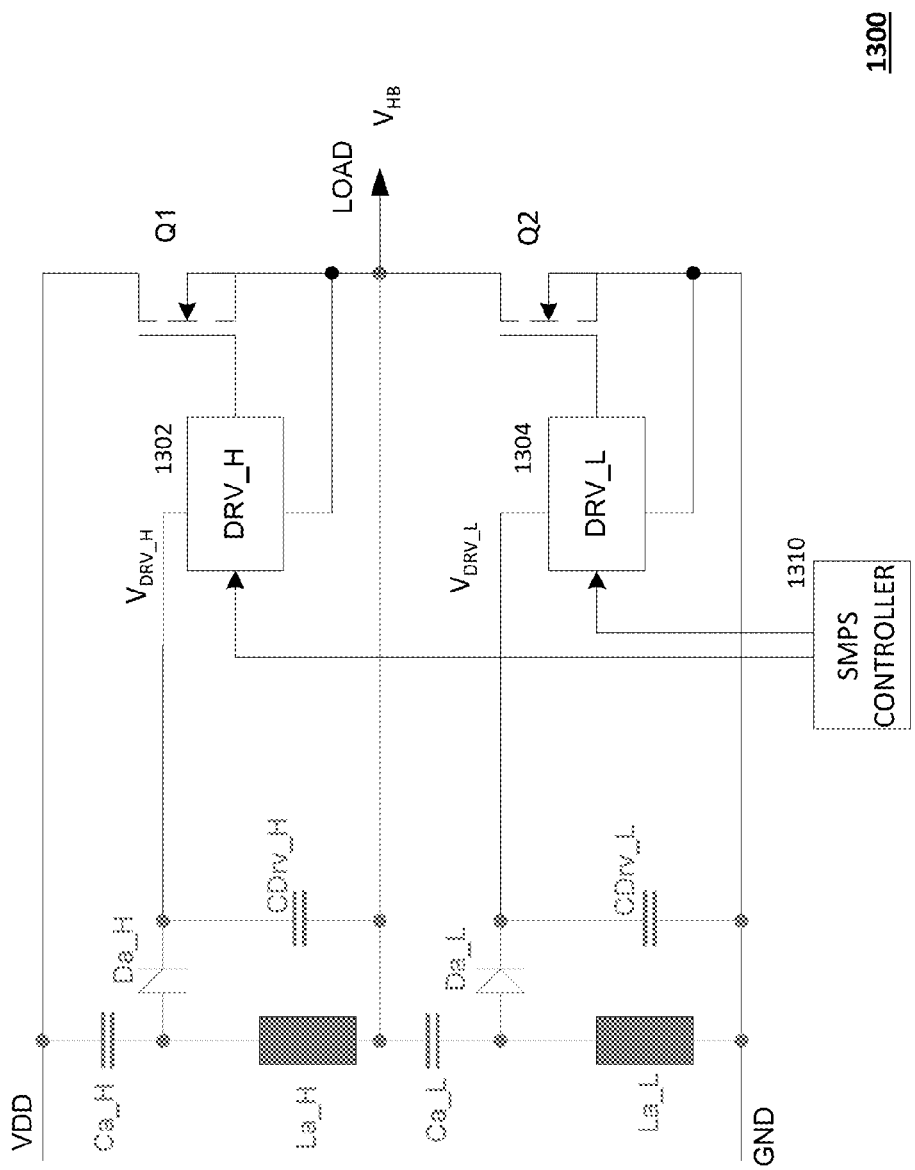
FIG. 13 illustrates an SMPS circuit arranged in a half-bridge configuration, and further configured to supply power to driver circuits within the SMPS circuit.

FIG. 13 illustrates an embodiment of an SMPS circuit 1300 arranged in a half-bridge configuration. This SMPS circuit 1300 includes two switch devices, shown as enhancement-mode MOSFETs Q1 and Q2. Driver circuits DRV_H 1302 and DRV_L 1304 generate control signals for, respectively, MOSFETs Q1 and Q2 based on control signals provided by an SMPS controller 1310. Each of the driver circuits has an associated resonant energy capturing and filtering circuit. The high-side resonant energy capturing and filtering circuit is comprised of capacitor Ca_H, inductor La_H, diode Da_H and capacitor CDrv_H, and supplies power to the high-side driver circuit 1302. The low-side resonant energy capturing and filtering circuit is similarly comprised and supplies power to the low-side driver circuit 1304. Each of these resonant energy capturing and filter circuits functions in a manner similar to that of the like circuit 240 illustrated in FIG. 2 and, hence, will not be described in further detail.

Figures 14A, 14B:
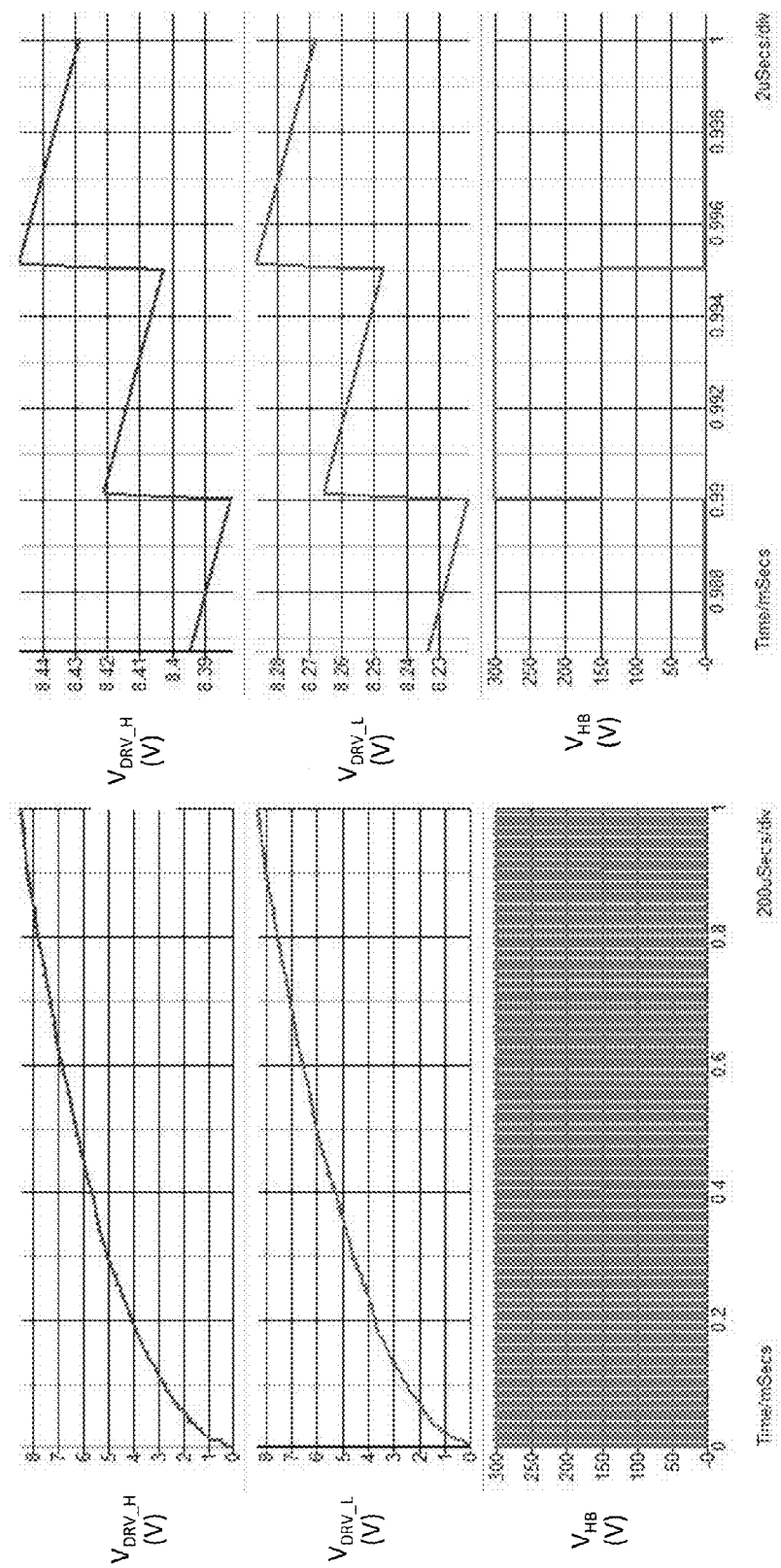
FIGS. 14A and 14B illustrate waveforms produced within an SMPS circuit arranged in a half-bridge configuration, as shown in FIG. 13.

FIGS. 14A and 14B illustrate waveforms produced within the SMPS circuit 1300 illustrated in FIG. 13. FIG. 14A illustrates how the voltages supplied to the high and low-side driver circuits, denoted $V_{DRV\_H}$ and $V_{DRV\_L}$, grow over time. FIG. 14B illustrates an expanded view of these waveforms, in which it can be seen that the voltages $V_{DRV\_H}$ and $V_{DRV\_L}$ increase rapidly with each transition of the half-bridge SMPS voltage output $V_{HB}$, and that the voltages $V_{DRV\_H}$ and $V_{DRV\_L}$ gradually dissipate during the time periods between transitions of $V_{HB}$. As expected, this timing of the voltage waveforms is similar to shown in FIGS. 3A-3C due to the fact that the resonant energy capturing and filtering circuits of FIGS. 2 and 13 are similar.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-mode power supply (SMPS) circuit connected to an input power source and an output load, the SMPS circuit comprising:
an SMPS controller configured to generate an output control signal;
a first switch device that is controlled by the output control signal and configured to provide output power to the output load; and
a resonant energy capturing and filtering circuit configured to supply power to the SMPS controller at a power supply input of the SMPS controller or of other auxiliary circuitry or of both, wherein the resonant energy capturing and filtering circuit is electrically connected to an output of the first switch device and is configured to capture and store energy from the input power source upon a transition of the first switch device from a conducting to a non-conducting state, or from a non-conducting to a conducting state, or both.

2. The SMPS circuit of claim 1, wherein the resonant energy capturing and filtering circuit comprises:
an inductor;
a first capacitor that is connected to the output of the first switch device and to the inductor;
a second capacitor connected to the power supply input and that is configured to store energy and to filter the power at the power supply input; and
a first diode that is configured to supply current from the inductor, the first capacitor, or both the inductor and the first capacitor, to the second capacitor and to the power supply input.

3. The SMPS circuit of claim 2, wherein the first capacitor is charged and stores energy during periods when the first switch device is not conducting.

4. The SMPS circuit of claim 2, wherein the inductor stores energy during periods when the first switch device is conducting.

5. The SMPS circuit of claim 2, further comprising:
a second diode connected between the inductor and the first capacitor, the second diode configured to allow current to flow out of the inductor and into the first diode, and configured to block current from flowing into the inductor from the first capacitor.

6. The SMPS circuit of claim 1, further comprising:
a normally on switch device connected between the input power source and the power supply input, wherein the normally on switch device is configured to provide current to the power supply input during a startup phase of the SMPS controller during which the SMPS controller is not yet generating the output control signal.

7. The SMPS circuit of claim 1, further comprising:
a normally on switch device connected in series between the input power source and the first switch device, wherein the normally on switch device and the first switch device are connected at a first connection point; and
a second diode connected between the first connection point and the power supply input, the second diode configured to prevent excessive voltage at the power supply input;
wherein the normally on switch device and the second diode supply power to the power supply input during a startup phase of the SMPS controller during which the SMPS controller is not yet generating the output control signal.

8. The SMPS circuit of claim 7, wherein the normally on switch device comprises a depletion-mode metal-oxide semiconductor field-effect transistor (MOSFET).

9. The SMPS circuit of claim 7, wherein the normally on switch device comprises a plurality of depletion-mode metal-oxide semiconductor field-effect transistors (MOSFETs) cascaded together.

10. The SMPS circuit of claim 1, wherein the first switch device comprises an enhancement mode metal-oxide semiconductor field-effect transistor (MOSFET).

11. The SMPS circuit of claim 1, further comprising:
a flyback converter wherein a primary winding of the flyback converter is connected between the input power source and the output of the first switch device.

12. The SMPS circuit of claim 1, wherein the SMPS circuit is a buck converter.

13. The SMPS circuit of claim 1, further comprising a clamping device configured to limit the voltage at the power supply input.

14. A switched-mode power supply (SMPS) circuit configured in a half-bridge configuration and connected to an input power source, the SMPS circuit supplying an output voltage waveform to an output load and comprising:
- an SMPS controller configured to generate a first output control signal and a second output control signal;
- a first switch device and a second switch device connected in series across the input power source, and having a common connection point that drives the output load;
- a high-side driver circuit that inputs the first output control signal and is configured to drive a high-side output control signal that controls the first switch device;
- a low-side driver circuit that inputs the second output control signal and is configured to drive a low-side output control signal that controls the second switch device;
- a high-side resonant energy capturing and filtering circuit configured to provide power to the high-side driver circuit, wherein the high-side resonant energy capturing and filtering circuit is configured to capture energy from the input power source when the output voltage waveform transitions between a low voltage state and a high voltage state; and
- a low-side resonant energy capturing and filtering circuit configured to provide power to the low-side driver circuit, wherein the low-side resonant energy capturing and filtering circuit is configured to capture energy from the input power source when the output voltage waveform transitions between a low voltage state and a high voltage state.

15. A method in a switched-mode power supply (SMPS) for supplying power to an SMPS controller, the SMPS including a first switch device configured to provide current to a load of the SMPS, the method comprising:
- supplying current from an input power source of the SMPS to the load of the SMPS by enabling the first switch device such that the first switch device is conducting;
- supplying current to a resonant energy capturing and filtering device via an electrical connection to the first switch device when the first switch device is enabled;
- disabling the first switch device such that the first switch device is not conducting;
- supplying current to the resonant energy capturing and filtering device via an electrical connection from the input power source, the supplied current not flowing through the first switch device when the first switch device is disabled; and
- supplying power to a power supply of the SMPS controller from the resonant energy capturing and filtering device.

16. The method of claim 15 wherein the resonant energy capturing and filtering device comprises a first capacitor, and the current supplied to the resonant energy capturing and filtering device when the first switch is disabled energizes the first capacitor.

17. The method of claim 15, wherein the resonant energy capturing and filter device comprises an inductor, and the current supplied to the resonant energy capturing and filtering device when the first switch is enabled energizes the inductor.

18. The method of claim 15, wherein the resonant energy capturing and filtering device comprises an inductor or a capacitor or both, and a diode, wherein the diode is activated to allow current to flow from the inductor or the capacitor or both to a power supply input of the SMPS controller.

19. The method of claim 15, wherein the resonant energy capturing and filtering device comprises:
- an inductor;
- a first capacitor that is connected to the output of the first switch device and to the inductor;
- a second capacitor connected to the power supply input and that is configured to store energy and to filter the power at the power supply input; and
- a first diode that is configured to supply current from the inductor, the first capacitor, or both the inductor and the first capacitor, to the second capacitor and to the power supply of the SMPS controller.

20. The method of claim 15, wherein the resonant energy capturing and filtering device comprises a normally on switch device connected between the input power source and the power supply of the SMPS controller, wherein the normally on switch device is configured to provide current to the power supply of the SMPS controller during a startup phase of the SMPS controller, the startup phase preceding an initial enabling of the first switch device.

* * * * *